US011334928B2

(12) United States Patent
Chaudhari et al.

(10) Patent No.: US 11,334,928 B2
(45) Date of Patent: May 17, 2022

(54) CAPTURING COMPANY PAGE QUALITY (71) Applicant: Microsoft Technology Licensing, LLC, Redmond, WA (US)

(72) Inventors: Rajan Ramesh Chaudhari, San Francisco, CA (US); Sparsh Agarwal, San Francisco, CA (US); Tomer Cohen, Palo Alto, CA (US); Divyakumar Menghani, Sunnyvale, CA (US); Aaron Tyler Rucker, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 775 days.

(21) Appl. No.: 15/960,345

(22) Filed: Apr. 23, 2018

(65) Prior Publication Data

US 2019/0325487 A1 Oct. 24, 2019

(51) Int. Cl.
*G06Q 30/02* (2012.01)
*G06N 20/00* (2019.01)
*G06F 16/958* (2019.01)
*G06Q 50/00* (2012.01)

(52) U.S. Cl.
CPC ......... *G06Q 30/0281* (2013.01); *G06N 20/00* (2019.01); *G06Q 50/01* (2013.01); *G06F 16/958* (2019.01)

(58) Field of Classification Search
CPC .............. G06Q 30/0281; G06Q 50/01; G06Q 30/0201; G06Q 30/0255; G06Q 30/0631; G06Q 30/0277; G06Q 30/0202; G06Q 50/163

See application file for complete search history.

(56) References Cited

U.S. PATENT DOCUMENTS

| 7,729,983 | B1 * | 6/2010 | Ellis | G06Q 40/00 705/37 |
| 8,015,091 | B1 * | 9/2011 | Ellis | G06Q 40/02 705/38 |
| 8,386,395 | B1 * | 2/2013 | Gordon | G06Q 40/025 705/35 |
| 9,183,499 | B1 * | 11/2015 | Krivokon | G06F 16/951 |
| 9,460,471 | B2 * | 10/2016 | Bernard | G06Q 40/08 |
| 10,110,545 | B1 * | 10/2018 | Freay | H04L 51/046 |
| 10,445,152 | B1 * | 10/2019 | Zhang | G06Q 30/02 |

(Continued)

FOREIGN PATENT DOCUMENTS

WO WO-2017222836 A1 * 12/2017 ........... G06F 16/313

*Primary Examiner* — Maria C Santos-Diaz
(74) *Attorney, Agent, or Firm* — Schwegman Lundberg & Woessner, P.A.

(57) ABSTRACT

The technical problem of predicting the level of activity driven by a web page representing a company in an on-line social network system is addressed by providing a company page assessment system. A company page assessment system is configured to use a machine learning model to determine features and respective thresholds that signal the likelihood of a web page representing a company (a company page) to drive member activity in the on-line social network system. The company page assessment system also provides the ability to assess quality of a company page. Different quality levels of a company page can be indicated by respective labels "Complete Page," "Quality Page," and "Engaged Quality Page."

20 Claims, 4 Drawing Sheets

(56) References Cited

U.S. PATENT DOCUMENTS

| | | | |
|---|---|---|---|
| 2007/0198321 A1* | 8/2007 | Lakshminarayan | G06Q 30/0201 705/7.29 |
| 2010/0205024 A1* | 8/2010 | Shachar | G06Q 30/0244 705/7.33 |
| 2011/0022541 A1* | 1/2011 | Miles | G06Q 40/025 705/36 R |
| 2011/0246406 A1* | 10/2011 | Lahav | G06N 20/00 706/46 |
| 2014/0019239 A1* | 1/2014 | Qu | G06F 16/24578 707/E17.046 |
| 2014/0122622 A1* | 5/2014 | Castera | H04L 51/04 709/206 |
| 2014/0142967 A1* | 5/2014 | Bedrosian | G16H 10/20 705/2 |
| 2014/0279793 A1* | 9/2014 | Wohlstadter | G06Q 30/0277 706/46 |
| 2015/0066630 A1* | 3/2015 | Ge | G06Q 30/0244 705/14.43 |
| 2015/0220972 A1* | 8/2015 | Subramanya | G06Q 30/0246 705/14.45 |
| 2015/0347432 A1* | 12/2015 | Tsai | G06F 40/143 715/202 |
| 2016/0026961 A1* | 1/2016 | Chang | G06F 16/2228 705/7.39 |
| 2016/0034111 A1* | 2/2016 | Sahai | G06Q 10/10 715/730 |
| 2016/0063546 A1* | 3/2016 | Ghosh | G06Q 30/0255 705/14.53 |
| 2016/0110673 A1* | 4/2016 | Kunapuli | G06Q 10/06393 705/7.39 |
| 2016/0210327 A1* | 7/2016 | Li | G06F 16/2425 |
| 2017/0154495 A1* | 6/2017 | Sri | G06Q 30/0241 |
| 2017/0185904 A1* | 6/2017 | Padmanabhan | G06N 5/04 |
| 2017/0270544 A1* | 9/2017 | Jaidka | G06Q 30/0202 |
| 2018/0060749 A1* | 3/2018 | Yan | G06Q 50/01 |
| 2018/0253759 A1* | 9/2018 | Deng | G06Q 30/0243 |
| 2018/0315062 A1* | 11/2018 | Parekh | G06F 3/0482 |
| 2018/0365710 A1* | 12/2018 | Halecky | G06F 16/955 |
| 2019/0005540 A1* | 1/2019 | Ganapathisubramanian | G06Q 30/0204 |
| 2019/0034976 A1* | 1/2019 | Hamedi | G06Q 30/0243 |
| 2019/0114662 A1* | 4/2019 | Bennion | G06Q 30/0277 |
| 2019/0188594 A1* | 6/2019 | Yuan | G06N 7/005 |
| 2019/0205471 A1* | 7/2019 | Muthuregunathan | G06F 16/334 |
| 2019/0236640 A1* | 8/2019 | Drake | G06Q 30/0244 |
| 2019/0295122 A1* | 9/2019 | Kumar | G06Q 30/0277 |
| 2019/0333082 A1* | 10/2019 | Sinnott | G06Q 30/0202 |

* cited by examiner

CAPTURING COMPANY PAGE QUALITY

TECHNICAL FIELD

This application relates to the technical fields of software and/or hardware technology and, in one example embodiment, to machine learning and system and method for automatically capturing company page quality.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member. An on-line social network may also maintain company profiles—also referred to as company pages. A company page represents a company in in the on-line social network and is represented by one or more web pages that can be accessed by users. Company pages and member profiles in on-line social network can be thought of as two different types of entities. Other entities maintained in an on-line social network are job postings pages, school pages, skills, and topics. Together, these entities can be thought of as an economic graph with nodes representing entities and edges representing interaction (direct, as well as indirect) between the entities

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system for capturing company page quality in an on-line social network system is described. In the following description, for purposes of explanation, numerous specific details are set forth in order to provide a thorough understanding of an embodiment of the present invention. It will be evident, however, to one skilled in the art that the present invention may be practiced without these specific details. As mentioned above, some existing approaches to identify and process user-submitted question focus on finding an answer by using the submitted questions as is, or by permitting the users themselves to remove any noise information within the question.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

The technical problem of predicting the level of activity driven by a web page representing a company in an on-line social network system and identifying its quality level is addressed by providing a company page assessment system configured to use a machine learning model to determine features and respective thresholds that signal the likelihood of a web page to drive member activity in the on-line social network system. The company page assessment system also provides the ability to assign a quality level to a company page based on fielded data in the company page, connectedness information with respect to the company page, and event data stored for the company page. Different quality levels are indicated by respective flags that may be labeled "Complete Page," "Quality Page," and "Engaged Quality Page." Once a quality level of a company page is determined, it can be stored as associated with that company page and made available to users. For example, a quality level of a company page may be used beneficially as an indicator of the degree of success of a given campaign performed with respect to company pages. As another example, a quality level of a company page may be used in determining whether to target the company page with a preferred communications, etc.

As mentioned above, the company page assessment system is provided in the context of an on-line social network system. For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

An on-line social network may be viewed as a platform to connect people in virtual space with each other, with companies, jobs, as well as with knowledge based represented by topics pages. Each registered member of an on-line social network may be represented by a member profile (also referred to as a profile of a member or simply a profile), which, in turn, may be represented by one or more web pages, a structured representation of the member's information in XML (Extensible Markup Language), JSON (JavaScript Object Notation) or similar format. A member's profile web page of a social networking web site may emphasize employment history and education of the associated member. A company page, which represents a company in an on-line social network, may also be represented by one or more web pages. A company page includes fields that may be populated by the creator or an administrator of the page with information of a prescribed type. Some example fields of a company page includes the name field, company size field, industry field, country field, description field, etc.

A member profile often includes information indicating connectedness with other entities, such as other member profiles, company pages, or topics pages. Connectedness information, in some embodiments, is in the form of social links that indicate connection of one entity to another entity. For example, a social link in a member profile with respect to another member profile may indicate that the associated members have certain additional permissions with respect to each other's profiles, such as having access to more types of profile information than other, not connected, members, such as receiving in their news feed each other's posted updates, etc. Connectedness of two member profiles can be bilateral (where both profiles are connected to each other as peers) and it can also be unilateral, where a social link indicates that one member profile follows another profile. The follow relationship between two profiles indicates that the follower profile has access and receives updates with respect to the followed profile, but not vice versa, unless the followed profile also follows its follower profile. Connectedness may exist between a member profile and a company page, where, e.g., the member profile includes a social link indicating that the associated member follows the company page thereby having indicated an interest in receiving updates posted by and on the company page. A member profile that includes a social link indicating that the associated member follows a company page is considered to be a connected profile with respect to that company page.

Connectedness between a member profile and a company page may exist in a form other than a social link, it may be expressed by a reference to the company represented by the company page in a designated field of the member profile. Such designated field in the member profile may be a field intended to receive and store information about the associated member's current place of employment or information about the associated member's current place of employment. A member profile that references a company represented by a company page in one of such designated fields is considered to be a mapped profile with respect to that company page.

Company pages serve as an integral piece of the economic graph in an on-line social network and it is thus desirable to have understanding of which signals are useful for identifying those company pages that provide value back into the site's ecosystem. Variable and static signals associated with company pages can be used to predict consistent page activity, where activity is defined as receiving member actions (e.g., follower's engagement with published updates, apply clicks, etc.). In one embodiment, the machine learning model used to make said prediction is a binary classifier where the objective function is to predict if a company page will receive member activity periodically for a certain duration of time, e.g., on a monthly basis for 12 consecutive months. In embodiments where the machine learning model is a binary classifier, the predicted engagement label produced to indicate the positive prediction that a company page will receive member activity periodically for a certain duration of time is '1' and '0' to indicate the negative prediction that a company page will receive member activity periodically for a certain duration of time. The predicted quality level label can be saved as associated with the subject company page for future reference.

As mentioned above, the company page assessment system also provides the ability to assess quality level of a company page. Different quality levels are indicated by respective flags that can be stored as associated with the company page and made available to users. For example, the "Unclaimed" label may be produced to indicate near-non-existent quality level, the "Complete Page" label may be produced to indicate that the company page provides sufficient descriptive information about the associated company, the "Quality Page" label may be produced to indicate that the company page has followers or that the associated company is listed as the place of employment in some of the member profiles. Finally, the "Engaged Quality Page" label may be produced to indicate that the company page generates content that is likely to generate member activity (such as, e.g., clicks, likes, shares, comments, etc.) in the on-line social network.

A machine learning model (that produces a binary output with respect to whether a company page will receive member activity periodically for a certain duration of time or one of the labels described above) takes, as input, features of a subject company page that, collectively, illustrate data coverage, graph connectivity, and action recency associated with the subject company page. Features of a company page may be referred to as company features.

The features that the model takes as input includes fielded data (e.g., company name, company description, company address, company size, etc.), connectedness data (e.g., the number of members that follow the company page and the number of members that indicate in their profiles that they are current or past employees of the company), and event data (e.g., the number of days since fielded data of the company page was updated, etc.). The features associated with a company page have respective values. For example, for a given company page the "company location" feature may have its value as an alpha-numeric string representing the company's geographic location. The "followers" feature may have its value as the number of members in the on-line social network system that follow the company page. Below, in Table 1, is an example of a set of features used to determine quality level of a company page.

TABLE 1

1. Claimed Flag (nominal)
   a. Flag indicating whether the Page has an admin
2. Description Flag (nominal)
   a. Flag indicating whether the Page has a description of length >= 200 characters
3. Mapped Members (numeric)
   a. Count of employers/alumni associated with the organization
4. Followers (numeric)
   a. Count of members following the Page
5. Company Size Flag (nominal)
   a. Flag indicating whether the Page has a company size
6. Address Flag (nominal)
   a. Flag indicating whether the Page contains an address
7. URL Flag (nominal)
   a. Flag indicating whether the Page contains an url
8. Logo Flag (nominal)
   a. Flag indicating whether Page has a headquarter country
9. Industry Flag (nominal)
   a. Flag indicating whether Page has an industry
10. Last Published Update (numeric)
   a. Number of days since last update published TABLE 1-continued 11. Last Job Listed (numeric)
    a. Number of days since last job was listed (free or paid)
12. Last Company Page Edit (numeric)
    a. Number of days since last Page edit
13. Mapped Jobs (numeric)
14. Number of jobs associated with Page in the last 6 months (free or paid)

The company pages that exist in the on-line social network system and have respective levels of engagement can be visualized in the form of a funnel. At the top of the funnel are all company pages; this filters to complete pages which filters into quality pages, and finally filtering to engaged quality pages. As mentioned above, the features and thresholds used in each step of the funnel can be determined using a machine learning model. The model predicts whether or not a company page will be a monthly active company page with respect to the on-line social network, given a set of features. This model is trained using respective features of the company pages and information regarding activity of members of the on-line social network system with respect to the company pages. The model is then leveraged to help identify which features provide entropy towards achieving a specific objective, such as, e.g., an objective targeted by a campaign or a general objective of encouraging greater member engagement in the on-line social network system. The features that have been determined as influential with respect to predicting whether or not a company page will be a monthly active company page may be termed quality features. These quality features can be determined based on results produced by the machine learning model with respect to at least a subset of the company pages and their respective features. An inflection point analysis can be conducted to determine what thresholds lead to a correlation between the features associated with a company page and the probability of a company page being a monthly active page.

Shown below in Table 2 is an example set of quality features and thresholds that can be used as working definitions.

TABLE 2

Complete Page (CP):
  Must be claimed
  Must have ALL of the following: description, logo, URL, address, country, industry, company size
Quality Page (QP):
  Must be a Complete Page
  Must have ONE of the following:
    >= 100 followers OR >= 10 mapped members
Engaged Quality Page (EQP):
  Must be a connected company
  Must have ONE of the following:
    >= 1 update in the last 30 days OR >= 1 job posted in the last 30 days OR >= 1 company page edit/change in the last 30 days Example system for capturing company page quality in an on-line social network system in an on-line social network system may be implemented in the context of a network environment 100 illustrated in FIG. 1.

Figure 1:
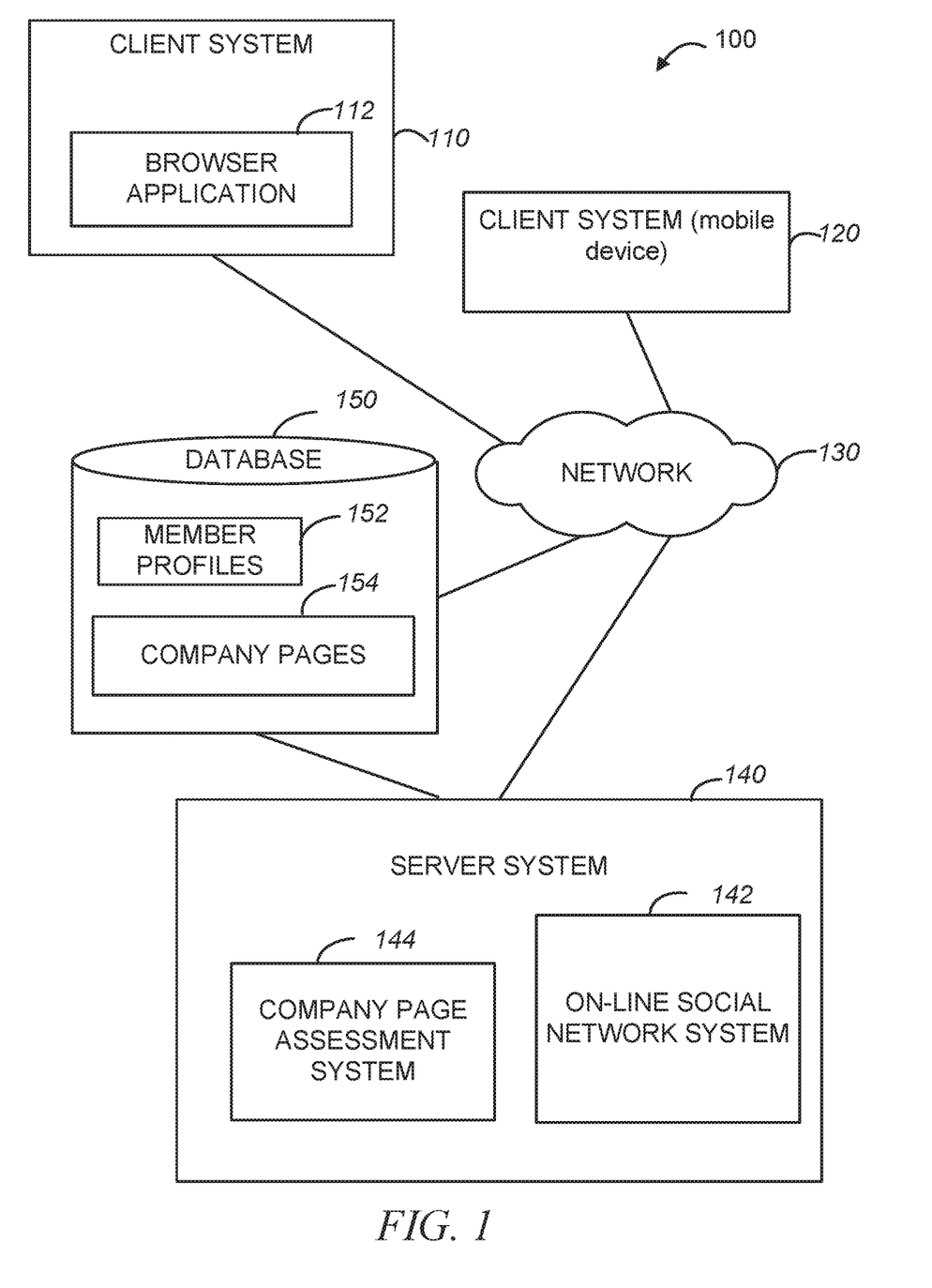
FIG. 1 is a diagrammatic representation of a network environment within which an example method and system for capturing company page quality may be implemented.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a company page assessment system 144 for capturing company page quality in an on-line social network system using the methodologies described herein. The company page assessment system 144 may be part of or in communication with the on-line social network system 142 and may use information stored in the database 150—the member profiles 152 and company pages 154. An example company page assessment system 144 is illustrated in FIG. 2.

Figure 2:
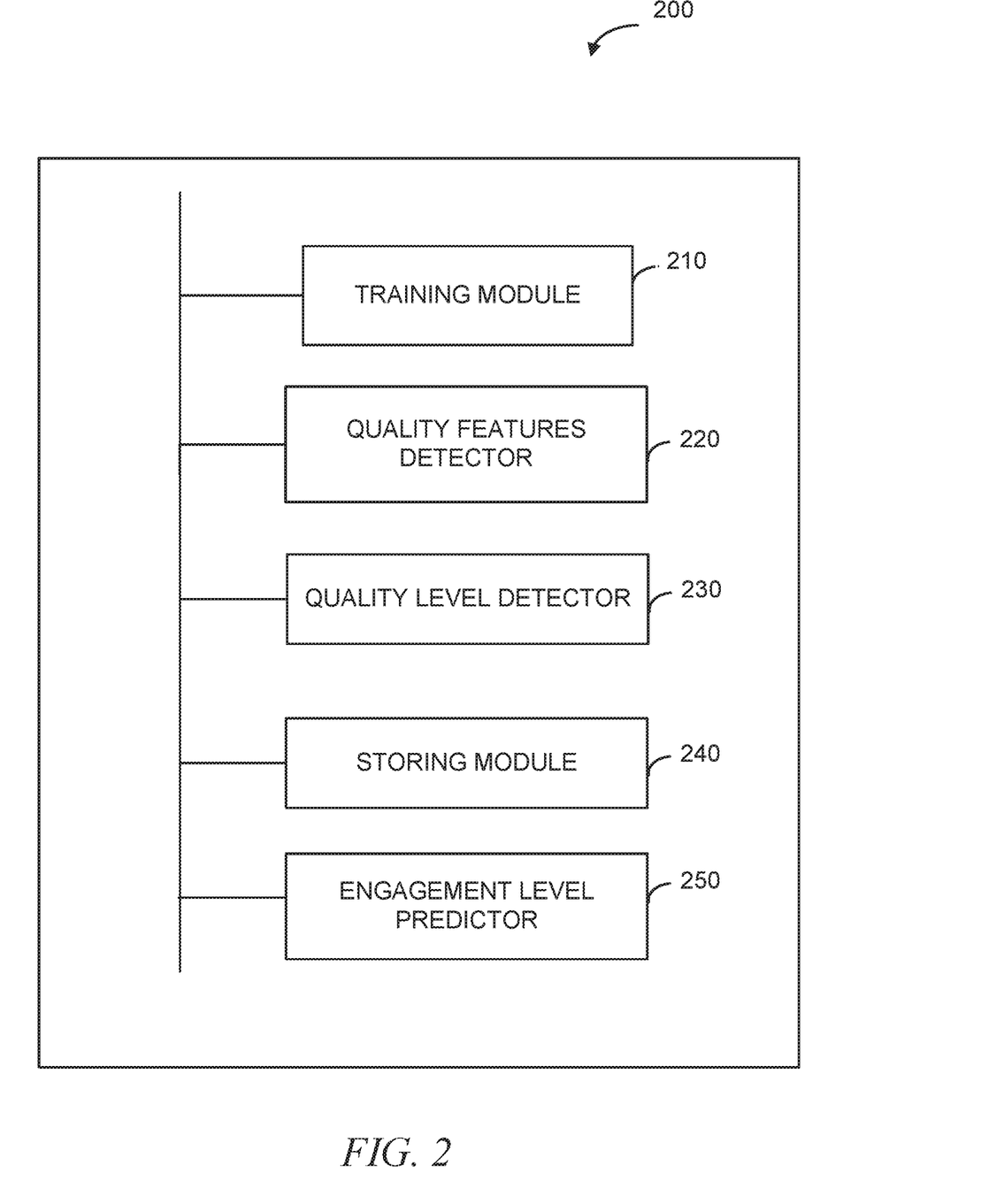
FIG. 2 is block diagram of a system for capturing company page quality, in accordance with one example embodiment.

FIG. 2 is a block diagram of a system 200 for capturing company page quality in an on-line social network system, in accordance with one example embodiment. The system 200, in some embodiments, corresponds to the company page assessment system 144. As shown in FIG. 2, the system 200 includes training module 210, a quality features detector 220, a quality level detector 230, a storing module 240, and a quality level predictor 250.

The training module 210 is configured to train the machine learning model, which is or is used by the quality level predictor 250 to calculate a predicted engagement level label indicating positive or negative prediction that a company page representing a company entity in the on-line social network system 142 of FIG. 1 will receive member activity in the on-line social network system periodically for a certain duration of time. The training module 210 uses, as training data, respective features of company pages from company pages 154 of FIG. 1 and information regarding activity of members represented by member profiles 152 (shown in FIG. 1) with respect to the company pages.

The quality features detector 220 is configured to identify quality features from the company features, for determining an engagement level of a company page, based on results produced by the machine learning model (which is or is used by the quality level predictor 250) with respect to at least a subset of the company pages and respective features of the subset of the company pages. An example set of quality features is provided in Table 1 above.

The quality level detector 230 is configured to accesses a company page representing a company entity in the on-line social network system 142 of FIG. 1 and to determine quality level of the company page based on the associated quality features, some of which are fielded data, some of which are connectedness data, and some of which are event data stored for the company page. The storing module 240 is configured to assign to the company page a flag indicating the determined quality level and store the flag as associated with the company page at operation 340. The quality level predictor 250, which in one embodiment is a machine learning model described above, is developed to calculate a predicted quality level label indicating positive or negative prediction that the company page will receive member activity in the on-line social network system periodically for a certain duration of time, based on the fielded data in the company page, the connectedness data with respect to the company page, and the event data stored for the company page. Some operations performed by the system 200 may be described with reference to FIG. 3.

Figure 3:
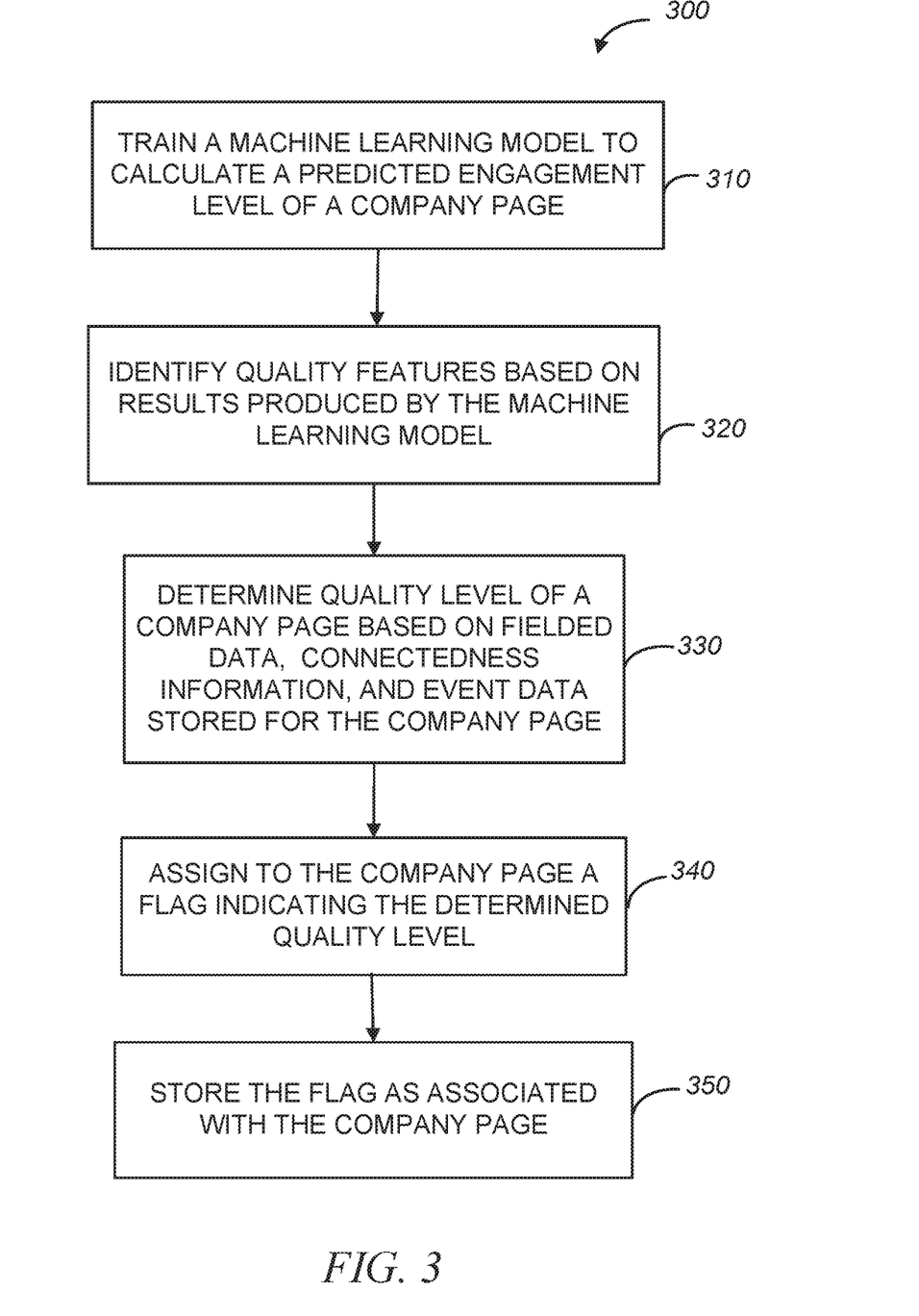
FIG. 3 is a flow chart of a method for capturing company page quality, in accordance with an example embodiment.

FIG. 3 is a flow chart of a method 300 for capturing company page quality in an on-line social network system, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the training module 210 of FIG. 2 trains the machine learning model, which is or is used by the quality level predictor 250 to calculate a predicted engagement level label indicating positive or negative prediction that a company page will receive member activity in the on-line social network system periodically for a certain duration of time. As stated above, the training module 210 uses, as training data, respective features of company pages and information regarding activity of members with respect to the company pages.

At operation 320, the quality features detector 220 identifies quality features from the company features, for determining an engagement level of a company page, based on results produced by the machine learning model with respect to at least a subset of the company pages and respective features of the subset of the company pages. At operation 330, the quality level detector 230 of FIG. 2 accesses a company page representing a company entity in the on-line social network system 142 of FIG. 1 and determines quality level of the company page based on fielded data in the company page, connectedness data with respect to the company page, and event data stored for the company page. As explained above, the specific items in the fielded data, the types of the connectedness data and the types of events in the event data to be used in the determining of the quality level of the company page can be identified using a machine learning model. The storing module 240 of FIG. 2 assigns to the company page a flag indicating the determined quality level at operation 340, and stores the flag as associated with the company page at operation 350.

Figure 4:
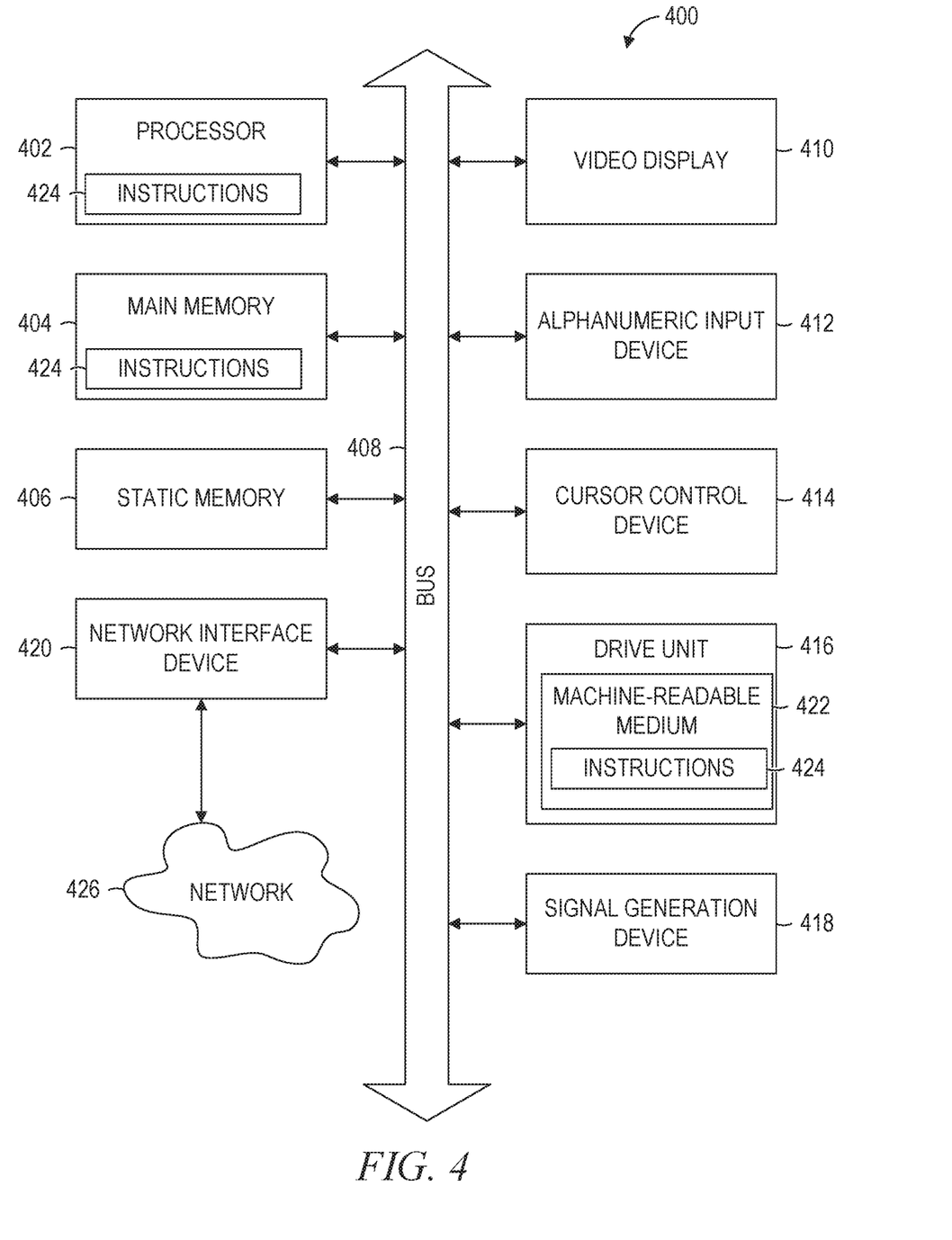
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system for capturing company page quality in an on-line social network system have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A method performed by a computer system of an online networking system that is hosting a plurality of company profile pages, the method comprising:

for a first set of company profile pages hosted via the online networking system, obtain for each company profile page a first set of features for use as training data to train a machine learning model to generate output for use in predicting a user engagement level for a company profile page, wherein features in the first set of features include fielded data, connectedness data and event data;

using the first set of features of the first set of company profile pages and information regarding activity of users of the online networking system with respect to the first set of company profile pages, train the machine learning model to calculate a predicted user engagement level indicating a positive or a negative prediction that a company profile page, representing a company entity in the online networking system, will receive user activity in the online networking system over a certain duration of time;

providing as input to the trained machine learning model a second set of features associated with a second set of company profile pages to generate output indicating for each company profile page in the second set of company profile pages a positive or a negative prediction that the company profile page will receive user activity;

based on output of the trained machine learning model with respect to at least a subset of the second set of company profile pages and the second set of features of the subset of the second set of company profile pages, identifying features from the second set of features as quality features for determining a user engagement level of a company profile page;

accessing a subject company profile page representing a subject company entity in the online networking system;

using at least one processor, determine a quality level of the subject company profile page based on values of the quality features associated with the subject company profile page;

assigning to the subject company profile page a status indicator indicating the determined quality level; and storing the status indicator as associated with the subject company profile page.

2. The method of claim 1, comprising conducting an inflection analysis to determine respective thresholds for determining that certain features of the second set of features are the quality features.

3. The method of claim 2, wherein the determining of the quality level of the subject company profile page comprises using the determined respective thresholds for the one or more of the quality features.

4. The method of claim 1, wherein the connectedness data comprises a number of user profiles that include a social link indicating that they follow the subject company profile page.

5. The method of claim 1, wherein the connectedness data comprises a number of user profiles that include a reference, in a designated field, to a company represented by the subject company profile page.

6. The method of claim 1, wherein the event data comprises an update posted on the subject company page.

7. The method of claim 1, wherein the event data comprises a job posting associated with the subject company page.

8. The method of claim 1, wherein the event data comprises an edit to any of the fielded data in the subject company profile page.

9. The method of claim 1, comprising monitoring and storing the event data associated with the subject company profile page.

10. The method of claim 1, wherein the machine learning model is a binary classifier.

11. A system that is hosting a plurality of company profile pages, the system comprising:

one or more processors; and a non-transitory computer readable storage medium comprising instructions that when executed by the one or processors cause the one or more processors to perform operations comprising:

for a first set of company profile pages hosted via the online networking system, obtaining for each company profile page a first set of features for use as training data to train a machine learning model to generate output for use in predicting a user engagement level for a company profile page, wherein features in the first set of features include fielded data, connectedness data and event data;

using the first set of features of the first set of company profile pages and information regarding activity of users of the online networking system with respect to the first set of company profile pages, train the machine learning model to calculate a predicted user engagement level label indicating a positive or a negative prediction that a company profile page representing a company entity in the online networking system, will receive user activity in the online networking system over a certain duration of time;

providing as input to the trained machine learning model a second set of features associated with a second set of company profile pages to generate output indicating for each company profile page in the second set of company profile pages a positive or a negative prediction that the company profile page will receive user activity;

based on output of the trained machine learning model with respect to at least a subset of the second set of company profile pages and the second set of features of the subset of the second set of company profile pages, identifying features from the set of features as quality features for determining a user engagement level of a company profile page;

accessing a subject company profile page representing a subject company entity in the online networking system;

determining a quality level of the subject company profile page based on values of the quality features associated with the subject company profile page;

assigning to the subject company page a status indicator indicating the determined quality level; and storing the status indicator as associated with the subject company profile page.

12. The system of claim 11, comprising conducting an inflection analysis to determine respective thresholds for determining that certain features of the second set of features are the quality features.

13. The system of claim 12, wherein the determining of the quality level of the subject company profile page comprises using the determined respective thresholds for the one or more of the quality features.

14. The system of claim 11, wherein the connectedness data comprises a number of user profiles that include a social link indicating that they follow the subject company profile page.

15. The system of claim 11, wherein the connectedness data comprises a number of user profiles that include a reference, in a designated field, to a company represented by the subject company profile page.

16. The system of claim 11, wherein the event data comprises an update posted on the subject company profile page.

17. The system of claim 11, wherein the event data comprises a job posting associated with the subject company page.

18. The system of claim 11, wherein the event data comprises an edit to any of the fielded data in the subject company page.

19. The system of claim 11, comprising monitoring and storing the event data associated with the subject company profile page.

20. A machine-readable non-transitory storage medium having instruction data executable by a machine to cause the machine to perform operations comprising:

for a first set of company profile pages hosted via the online networking system, obtain for each company profile page a first set of features for use as training data to train a machine learning model to generate output for use in predicting a user engagement level for a company profile page, wherein features of the first set of features include fielded data, connectedness data and event data;

using the respective features of the first set of company profile pages and information regarding activity of users of the online networking system with respect to the first set of company profile pages, training the machine learning model to calculate a predicted user engagement level indicating a positive or a negative prediction that a company profile page, representing a company entity in the online networking system, will receive user activity in the online networking system over a certain duration of time;

providing as input to the trained machine learning model a second set of features associated with a second set of company profile pages to generate output indicating for each company profile page in the second set of company profile pages a positive or a negative prediction that the company profile page will receive user activity;

based on output of the trained machine learning model with respect to at least a subset of the second set of company profile pages and respective features of the subset of the second set of company profile pages, identifying features from the second set of features as quality features for determining a user engagement level of a company profile page;

accessing a subject company profile page representing a subject company entity in the online networking system;

using at least one processor, determining a quality level of the subject company profile page based on values of the quality features associated with the subject company profile page;

assigning to the subject company profile page a status indicator indicating the determined quality level; and storing the status indicator as associated with the subject company profile page.

\* \* \* \* \*

UNITED STATES PATENT AND TRADEMARK OFFICE
CERTIFICATE OF CORRECTION

PATENT NO. : 11,334,928 B2
APPLICATION NO. : 15/960345
DATED : May 17, 2022
INVENTOR(S) : Chaudhari et al.

It is certified that error appears in the above-identified patent and that said Letters Patent is hereby corrected as shown below:

In the Claims

In Column 12, Line 49, in Claim 20, delete "machine-readable non-transitory" and insert --non-transitory machine-readable-- therefor Signed and Sealed this
Nineteenth Day of July, 2022

Katherine Kelly Vidal
*Director of the United States Patent and Trademark Office*